United States Patent [19]
Myers et al.

[11] Patent Number: 6,006,504
[45] Date of Patent: Dec. 28, 1999

[54] LARGE ROUND BALER HAVING WRAPPING MECHANISM FOR PLACING NET OVER EDGES OF BALE

[75] Inventors: Thomas Wilmer Myers, Bettendorf; Henry Dennis Anstey, Ottumwa, both of Iowa; Nissim Mass, Maemek, Israel; Yuval Leiber, D.A. Megido, Israel; Ishai Doron, Haemek, Israel; Jean Viaud, Sarreguimines, France

[73] Assignee: Deere & Company, Moline, Ill.

[21] Appl. No.: 09/008,515

[22] Filed: Jan. 16, 1998

[51] Int. Cl.[6] ................................................... B65B 53/00
[52] U.S. Cl. ............................................... 53/556; 53/587
[58] Field of Search .............................. 53/587, 556, 118, 53/211, 215, 389.4, 441

[56] References Cited

U.S. PATENT DOCUMENTS

| | | | |
|---|---|---|---|
| 4,144,696 | 3/1979 | Gustavsson | 53/587 X |
| 4,790,125 | 12/1988 | Merritt | 53/587 |
| 4,917,008 | 4/1990 | van den Wildenberg . | |
| 4,969,315 | 11/1990 | Ardueser et al. . | |
| 5,090,182 | 2/1992 | Bethge | 53/587 X |
| 5,103,621 | 4/1992 | Matsumoto | 53/587 X |
| 5,104,714 | 4/1992 | Leiber et al. . | |

FOREIGN PATENT DOCUMENTS

| | | |
|---|---|---|
| 3234748 C2 | 1/1989 | Germany . |

*Primary Examiner*—Linda Johnson

[57] ABSTRACT

A large round baler includes a net wrapping device mounted to the rear and bottom of the discharge gate of the baler. A spare roll of net material is stored above an active roll of net material which rests upon and is caused to be rotated by the upper roll of a pair of net material feed rolls. The rolls of material are wider than the baling chamber of the baler and net spreader rolls, including both raised spirals and spiral grooves, are provided along the net feed path so that the net is at its full width when it arrives at the inlet to the bale chamber which is located at a lower bale-forming belt support roll extending between opposite sidewalls of the gate at the lower front of the gate. A pair of guide plates are mounted to the insides of the bale chamber sidewalls and extend about an upper portion of the circumference of a net spreader rolls located at the opposite ends of the belt support roll. These guide plates are shaped and positioned such that they perform the functions of creating a space between the bale end and the side wall for receiving marginal portions of the net, defining together with the side walls, a channel which leads from the net spreader rolls to the space created for receiving the net, rounding the end edges of the bale for better reception of the marginal portions of the net and deflecting crop material away from the spirals of the net spreader rolls so as to prevent them from wrapping with crop which would interfere with the feeding of the marginal portions of the net to be placed over the edges or corners at the opposite ends of the bale. First and second alternate embodiments respectively have only the recess or the entire shape of inner surfaces of the guide plates formed into the sidewalls. In the latter case, openings are provided in the sidewalls adjacent the trailing part of the formed shape, as considered relative to the direction of rotation of a bale engaging the formed shape.

19 Claims, 5 Drawing Sheets

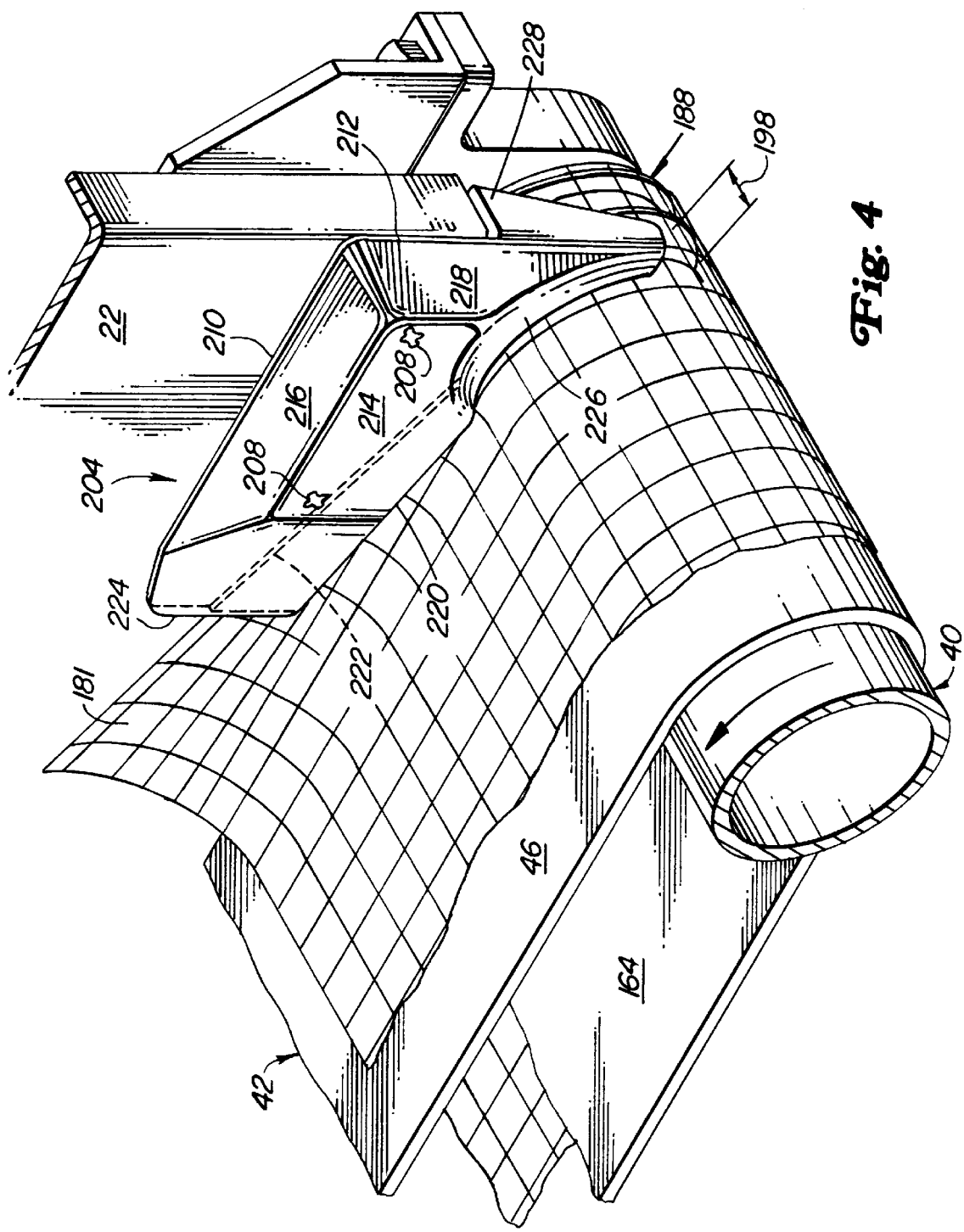

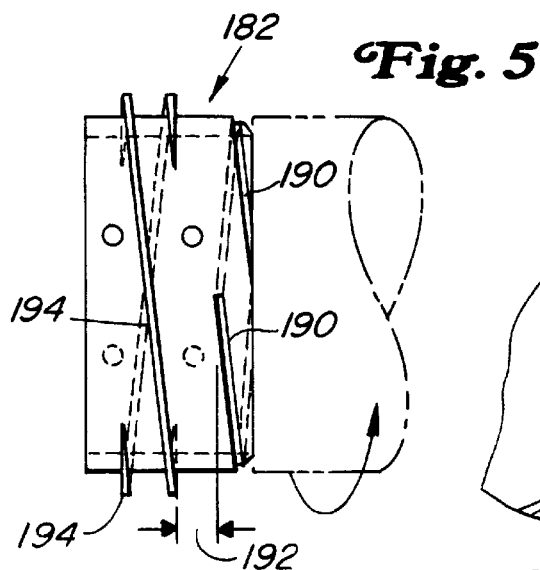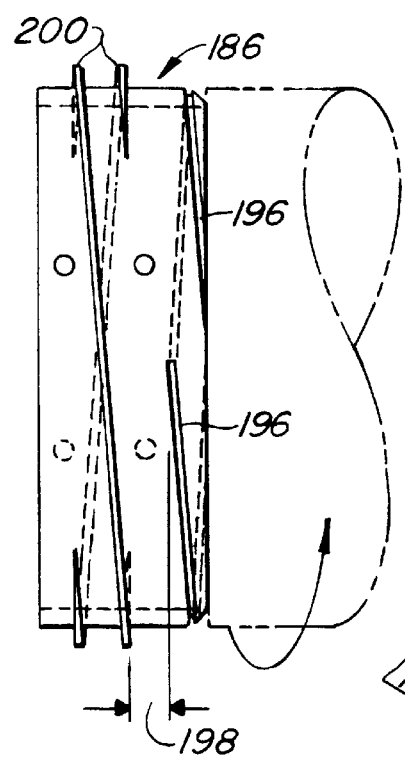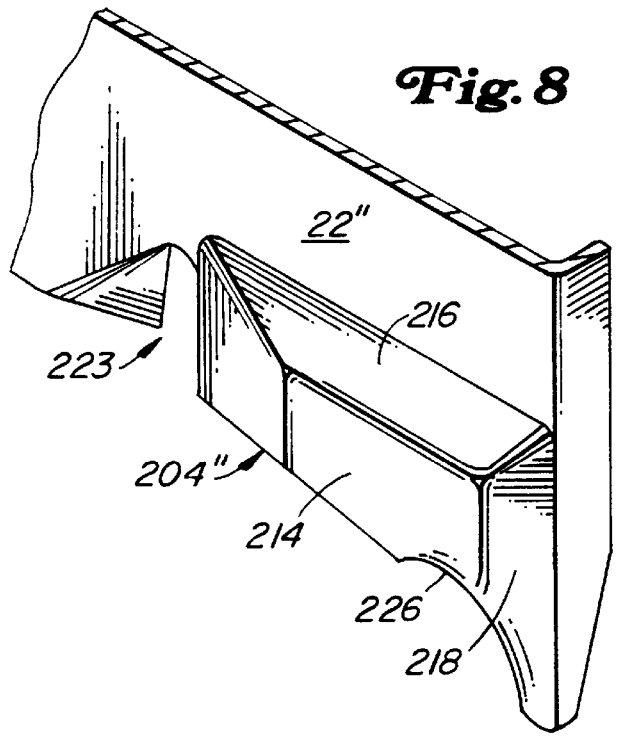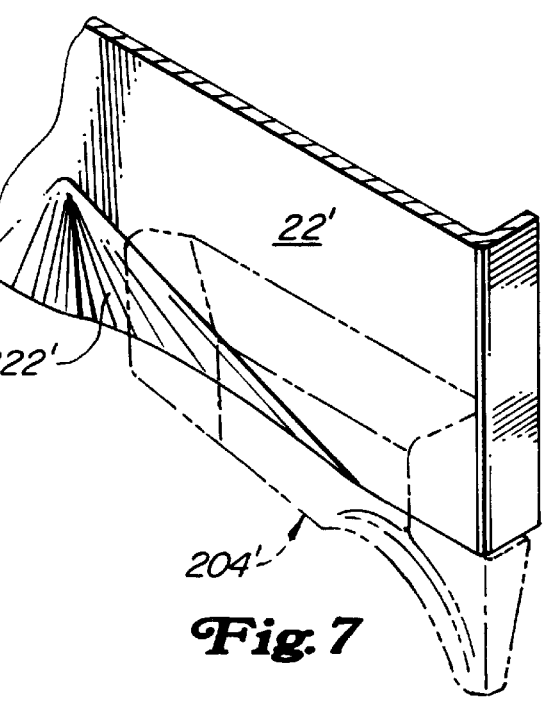

LARGE ROUND BALER HAVING WRAPPING MECHANISM FOR PLACING NET OVER EDGES OF BALE

BACKGROUND OF THE INVENTION

The present invention relates to mechanisms for wrapping large cylindrical bales while in the bale-forming chamber of a large round baler, and more specifically relates to such mechanisms for placing net over the edges of such bales.

In popular use today are large round balers equipped with net wrapping mechanisms which place a web of plastic net about the circumference of a bale prior to the bale being discharged onto the ground. U.S. Pat. No. 4,969,315, granted to Ardueser et al. on Nov. 13, 1990, discloses such a device mounted to the discharge gate of a large round baler having an expansible baling chamber. Most of these mechanisms do not consistently place net up to the edges at the ends of the bales and this results in spoilage occurring at the ends of the bale and also in the bales having a somewhat poor appearance.

It has been recognized that the above-mentioned drawbacks associated with current net wrapping mechanisms could be avoided by also wrapping the corners and outer end portions of the bale (see U.S. Pat. No. 4,917,008 granted to Wildenberg et al. on Apr. 17, 1990). In order for the edge zones of the material to fold about the end edges of the bale and cover and extend a short distance on the end faces of the bale, this patent teaches that outer borders of the net should be made with elastic filaments. The making of net with different longitudinal elasticity across its width is somewhat inefficient and the usage of such net in some delivery systems is not entirely satisfactory since it is desirable to maintain a certain tension in the net as it is being wrapped around a bale in order to obtain a tight wrap without rupturing the material, and the control of tension in net having different elasticity across its width poses design difficulties.

U.S. Pat. No. 5,104,714, granted to Leiber et al. on Apr. 14, 1992 discloses a net wrap material constructed from thin ribbons of thermoplastic material, developed for wrapping pallet loads or agricultural bales, which exhibits a uniform, high degree of elasticity across its width when stretched in the longitudinal direction. The preferred characteristics of the knitted net material is to have an elongation at break of more than about 60%, an elastic limit of more than about 6% and an elasticity of more than 15% when elongated more than 40%.

SUMMARY OF THE INVENTION

According to the present invention there is provided an improved mechanism for applying net over the ends of large cylindrical bales located in the bale-forming chamber of a large round baler.

An object of the invention is to provide a wrapping mechanism for use in wrapping cylindrical bales formed in a round baler, the wrapping mechanism efficiently and reliably applying net wrapping material so that it extends over the ends of the bales.

A more specific object of the invention is to provide a net wrapping mechanism mounted to the discharge gate of a large round baler and including spiral rolls for feeding the net to a width greater than that of the bale-forming chamber.

Yet another specific object of the invention is to provide a net wrapping mechanism, as set forth in one or more of the preceding objects, wherein guide plates or guide surfaces are respectively provided at opposite sides of outer peripheral portions of the baling chamber for deflecting outer peripheral portions of the bale away from the sidewalls of the baling chamber, so as to create voids at the rear ends of the plates, and for directing outer marginal portions of the net to said voids for being applied over the edges and outer peripheral portions of the ends of the bale.

Still another object of the invention is to provide guide plates, as defined in the immediately preceding object, which also are designed to perform one or more of the additional functions of deflecting crop away from spiral rolls located beneath lower edges of the guide plates, and of rounding the end edges of the bale as it rotates past a radiused portion of the plate.

Another specific object of the invention is to provide a net wrapping mechanism mounted to the discharge gate of a baler having an expansible baling chamber formed in part by a plurality of side-by-side mounted belts and wherein the discharge gate carries lower rear and lower front belt support rolls which each have opposite ends defined by wrap material spreader rolls extending outwardly beyond opposite sidewalls of the baler discharge gate.

These and other objects will become apparent from a reading of the ensuing description together with the appended drawings

BRIEF DESCRIPTION OF THE DRAWINGS

FIG. 4 is an enlarged right front perspective view showing that portion of the structure of FIG. 3 including the left-hand net guide plate together with the front, left-hand net spreader roll.

FIG. 5 is a front view of the right-hand, rear net spreader roll.

FIG. 6 is a front view of the right-hand, front net spreader roll.

FIG. 7 shows a first alternate embodiment of the gate sidewalls and net guide plate wherein the sidewalls are recessed instead of the guide plates.

FIG. 8 shows a second alternate embodiment wherein the gate sidewall embodies the inner and front surface features and the lower edge feature of the guide plate of FIG. 1 and is provided with an opening for permitting the net to enter the baling chamber at a location behind the inner surface features.

DESCRIPTION OF THE PREFERRED EMBODIMENT

Initially, it is to be noted that various components are described as existing in pairs while only one of each pair is shown and it is to be understood that the unshown component is the same or similar in construction to the one shown.

Figure 1:
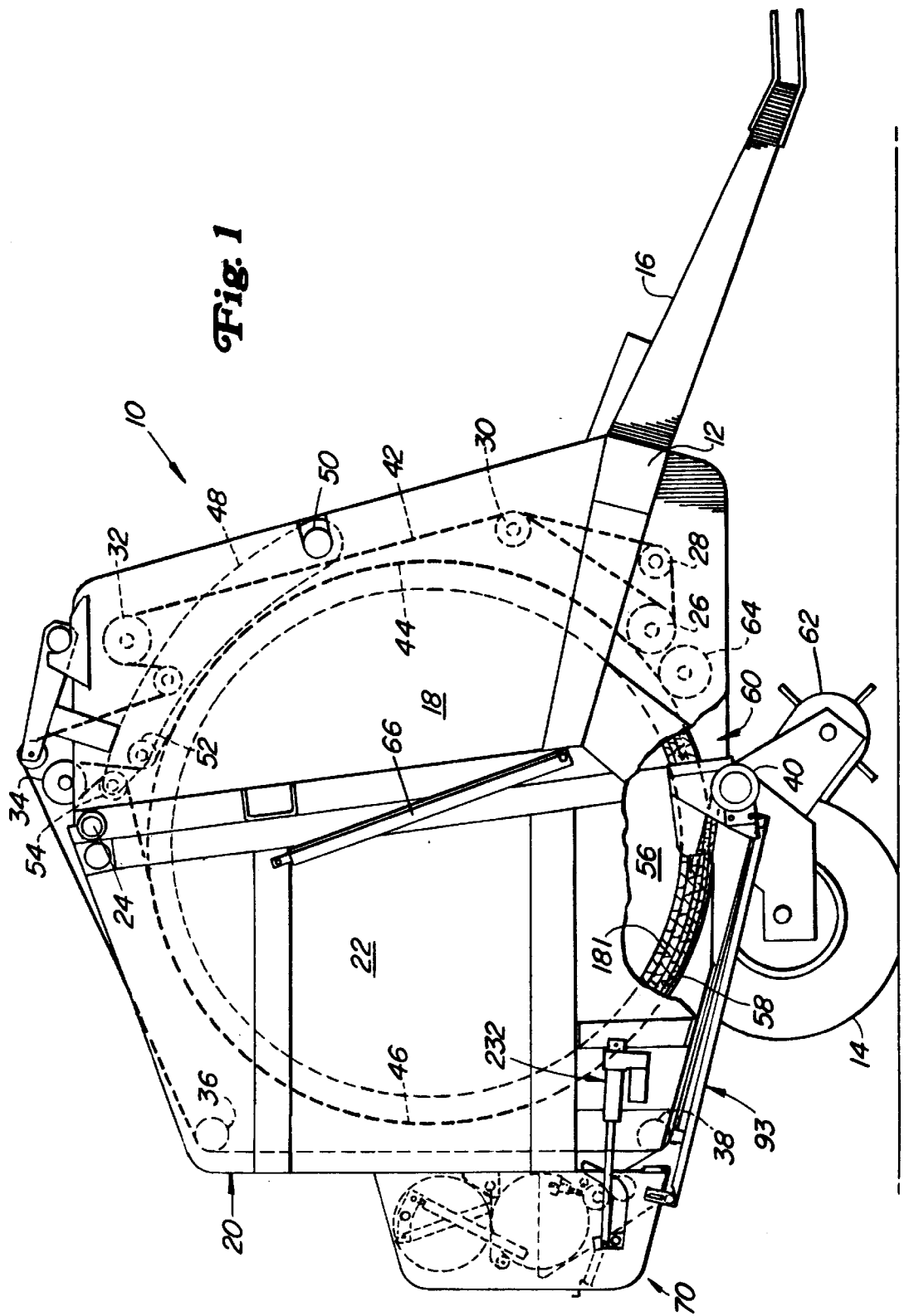
FIG. 1 is a right side elevational view, with parts broken away for clarity, of a large round baler equipped with a net wrapping mechanism constructed in accordance with the present invention.

Referring now to FIG. 1, there is shown a baler 10 of the type for making large cylindrical bales and commonly called a large round baler. The baler 10 comprises a main frame 12 supported on a pair of ground wheels 14, of which only the left-hand ground wheel is shown. A draft tongue 16, which is adapted for being connected to a tractor, is secured to the main frame 12. A pair of transversely spaced vertical sidewalls 18 is joined to the frame 12 and has respective upright rear ends. A bale discharge gate 20 including opposite sidewalls 22 is vertically pivotally attached, as at 24, to upper rear locations of the sidewalls 18, the sidewalls 22 having forward ends which abut against the rearward ends of the sidewalls 18 when the gate 20 is in a lowered closed position as shown.

The pairs of sidewalls 18 and 22 rotatably support the opposite ends of a plurality of bale-forming belt support rolls adjacent the periphery of the sidewalls. Specifically, beginning at a lower central location of the sidewalls 18 and proceeding counterclockwise, there are mounted a driven roll 26, a lower front roll 28, an intermediate front roll 30, an upper front roll 32, and an upper rear roll 34; and continuing counterclockwise from an upper rear location of the gate sidewalls 22 there is mounted an upper rear roll 36, a lower rear roll 38 and a lower front roll 40. Located between the pairs of sidewalls 18 and 22 and supported in side-by-side relationship to one another across the various belt support rolls are a plurality of endless bale-forming belts 42. Except for some of the belts 42 which skip the lower front roll 28, the belts are trained so that they serially engage the rolls 26, 28, 30, 32, 36, 38, 40 and 34. A front run 44 of the belts 42 extends upwardly from the driven roll 26 to the roll 34. Similarly, a rear run 46 of the belts 42 extends upwardly from the lower front gate roll 40 to the roll 34. Mounted between rear end locations of a pair of rearwardly extending tensioning arms 48, which are vertically pivotally mounted, as at 50, to a mid-height location at the front of the sidewalls 18, are closely spaced, front and rear idler rolls 52 and 54, with the belt runs 44 and 46 cooperating with the sidewalls 18 and 22 to define an expansible baling or bale-forming chamber 56, closed at its top by the idler rolls 52 and 54, and here shown in a state of considerable expansion and containing a bale 58. When the chamber 56 is empty, the front and rear runs 44 and 46 of the belts 42 respectively converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54, the chamber 56 thus being wedge-shaped as viewed from the side. The bottom of the chamber 56 is provided with a crop inlet 60 extending between the driven roll 26 and the lower front gate roll 40. Crop products are introduced into the inlet 60 by a pickup 62 for being rolled into a bale, such as the bale 58 by the action of the front and rear runs 44 and 46 of the belts 42, which are respectively driven so as to travel toward and away from the inlet, and initially also by a starter roll 64 rotatably mounted in the sidewalls 18 adjacent to and being driven in the same direction as the driven roll 26 so that it operates to strip crop being carried downwardly by the front run of belts 44. As the bale 58 is being formed, the chamber 56 yieldably expands, to a predetermined size as shown, against the force established in the belts by a tensioning system including the pair of tensioning arms 48 together with a pair of tensioning springs (not shown) and a pair of hydraulic cylinders (not shown) coupled between the walls 18 and the arms 48 for resisting upward movement of the arms, in a manner well known in the art. A pair of gate cylinders 66 are provided for swinging the gate 20 upwardly, about the pivotal attachment 24, to an open position when it is desired to discharge the bale 58 onto the ground.

Figure 2:
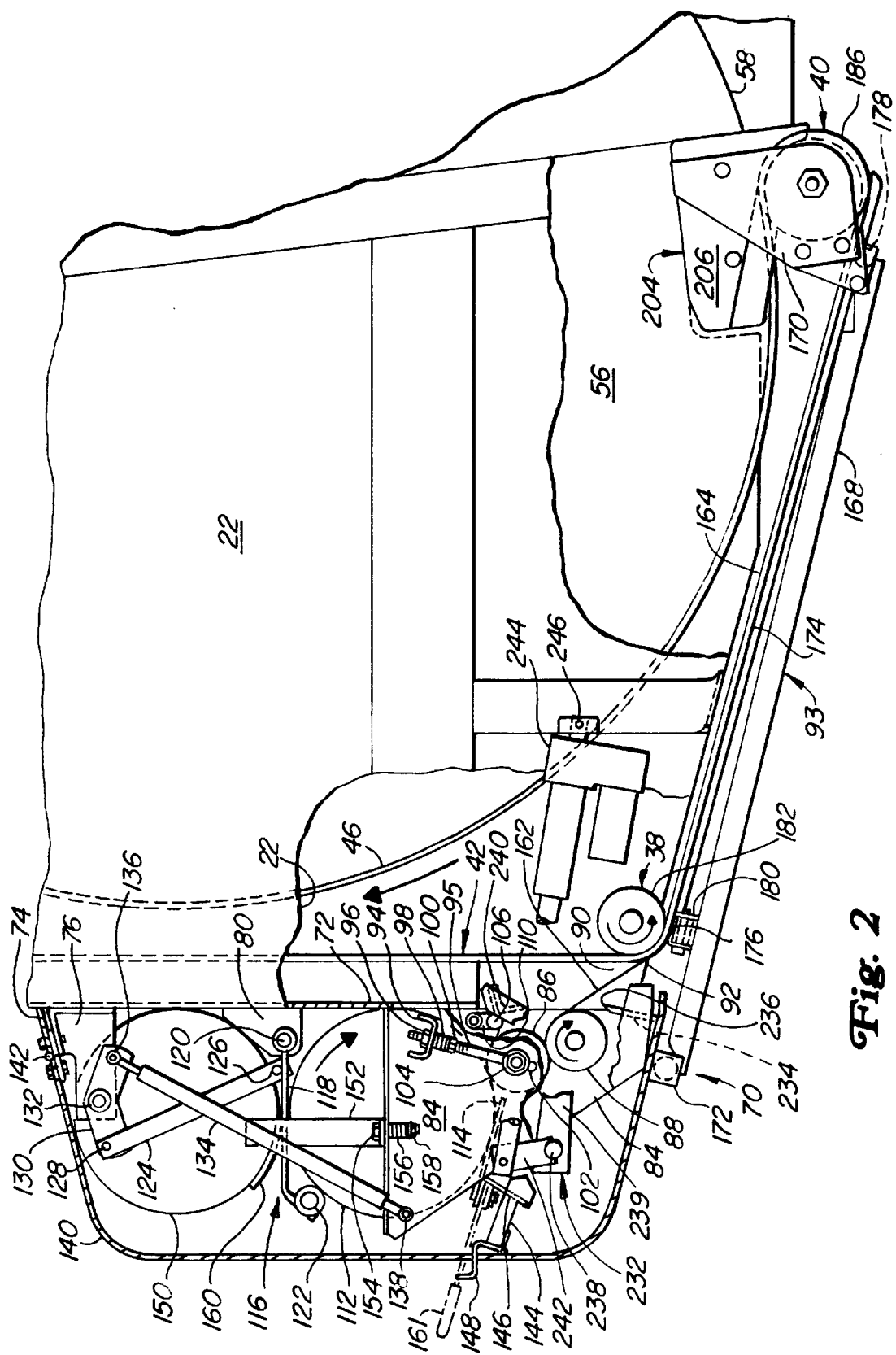
FIG. 2 is an enlarged, right-side elevational view, with parts removed, showing the net wrapping mechanism illustrated in FIG. 1.
Figure 3:
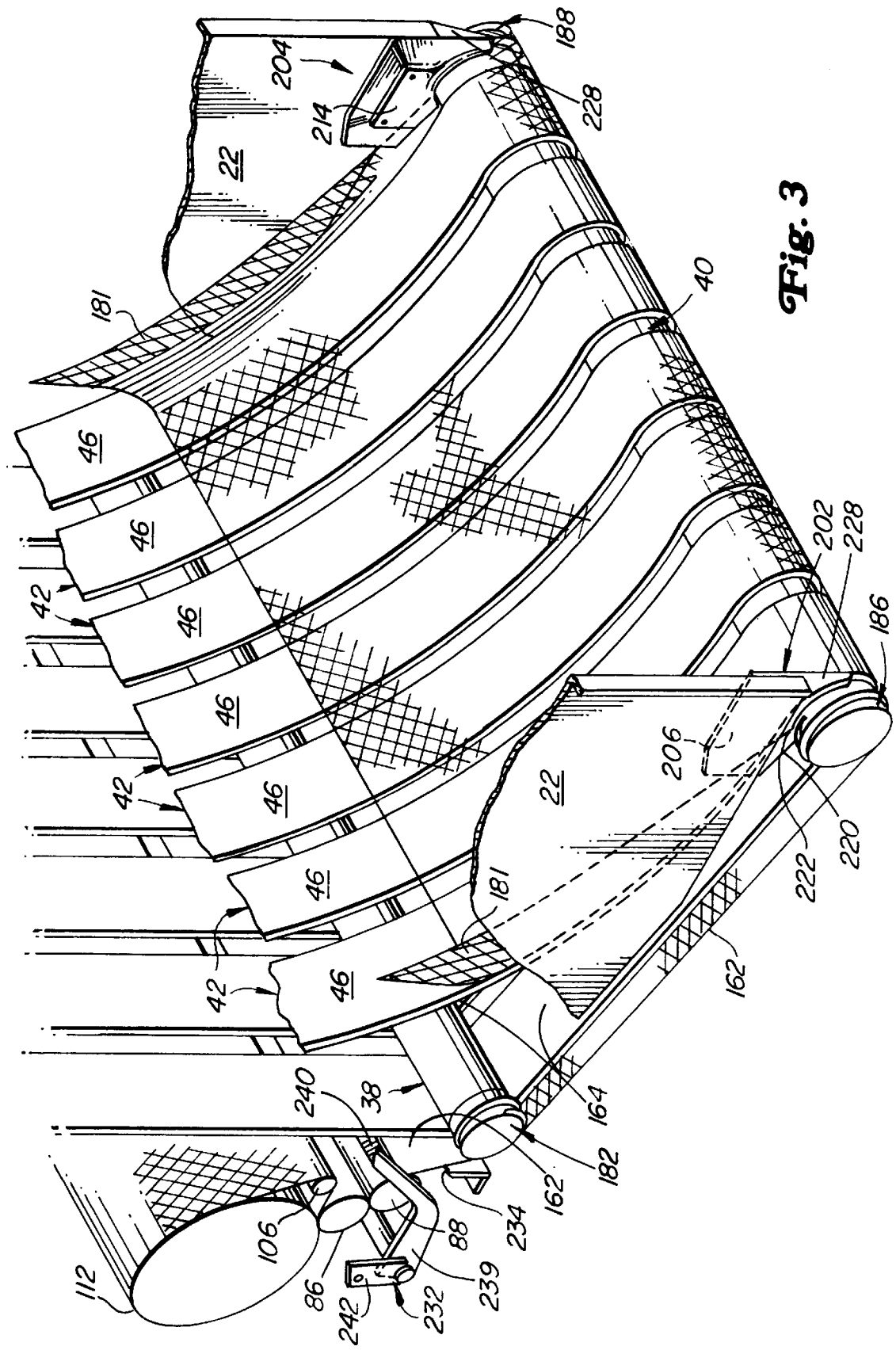
FIG. 3 is a somewhat schematic, right front perspective view showing the length of net material extending beneath the lower front and lower rear belt support rolls of the discharge gate and into the baling chamber and the configuration of the net takes when wrapping a bale, omitted for clarity, located in the baling chamber.

Referring now also to FIGS. 2 and 3, there is shown a net wrapping mechanism 70 mounted to the rear and bottom of the discharge gate 20 for wrapping bales formed in the baling chamber 56, such as the bale 58, prior to the bales being discharged onto the ground. It is to be noted that the mechanism 70 is designed, in a manner described below, for dispensing a web of net material having a width that is greater than the width of the baling chamber 56 in such a way that the net material extends over the end corners and outer peripheral portions of the opposite ends of the bale 58. While net material of different constructions may be used, the preferred net material is made of knitted ribbons of thermoplastic material in accordance with the teachings of the aforementioned U.S. Pat. No. 5,104,714. However, while that patent teaches wrapping a load by stretching the material about 30–50% when wrapped upon its load, the structure of the present invention has been found to produce sufficiently tight wrapped bales if the material is stretched by only about 15% during wrapping of the bale.

The mechanism 70 includes a support structure, mounted to the bottom half of the rear of the gate 20, comprising a transverse vertical panel 72 extending across and being fixed to vertical flanges respectively defining rear ends of the opposite sidewalls 22 of the gate. The panel 72 has an upper end which is defined by a downwardly and rearwardly extending flange 74. Bolted to upper right- and left-hand areas of the panel 72 beneath the flange 74 are respective transverse legs of a pair of angular, crank arm support brackets 76. Spaced vertically below the pair of support brackets 76 and having transverse legs bolted to the panel 72 are a pair of angular biasing arm support brackets 80. The support structure of the wrapping mechanism 70 further includes a pair of longitudinally extending, vertical support walls 84, which are approximately right-triangular in side view and have forward, vertical sides defined by transverse flanges that overlap a lower portion of the panel 72 and are secured, as by threaded fasteners, not shown, to structure at the rear of the gate 20 so as to be spaced transversely from each other by a distance greater than the distance between the gate sidewalls 22, i.e., greater than the width of the baling chamber 56.

Extending between and having their opposite ends rotatably mounted to the support walls 84 are a pair of wrap material feed rolls 86 and 88, with the roll 86 being disposed above and rearwardly of the roll 88 such that a wrap material flight path, defined by a plane disposed tangentially to the rolls at their bite or nip, extends beneath the panel 72 and intersects a vertical run of the belts 42, that extends between the upper and lower belt support rolls 36 and 38, respectively. The wrap material flight path intersects the belts 42 at a location above a nip or bite 90 defined by a net material guide pan portion 92, forming part of a wrap material guide assembly 93, described below, and a portion of the belts 42 engaged with the lower rear support roll 38. The upper roll 86 is mounted so as to be biased toward the lower roll 88. Specifically, fixed to outer surfaces of each of the walls 84 is a u-shaped bracket 94. The threaded ends of a pair of eye bolts 95 respectively project upwardly through the pair of brackets 94 and are held in an adjusted position by a nut 96. A coil spring 98 is located on each eye bolt 95 below the associated bracket 94 and a nut 100 loads each spring against the associated bracket. Projecting through the eye of each of the eye bolts 95 and through an adjustment slot 102 provided in the adjacent wall 84 is a feed roll mounting bolt 104 that serves to rotatably mount the feed roll 86 to the eye bolt and for moving toward and away from the lower roll 88 as permitted by the slots 102. A wrap material guide roll 106 extends between and is rotatably mounted to the lower ends of a pair of straps 110 fixed to the support walls 84 at respective locations spaced forwardly and upwardly from the upper feed roll 86.

The upper feed roll 86 is preferably in the form of a metal roll covered with rubber and, as viewed in FIG. 2, is driven counterclockwise. The drive for the roll 86 is by a variable speed pulley and belt arrangement of conventional construction (not shown) including a pulley mounted to a shaft coupled as an extension of the lower support roll 38 so that there is always a direct relationship between the speed of the bale-forming belts 42 and the peripheral speed of the wrap material feed rolls 86 and 88. The variable speed drive is then adjusted such that the belts 42 are traveling at a predetermined amount greater than the peripheral speed of the net material feed rolls so as to produce a relatively high tension in the net wrap material during wrapping of the bale 58, this tension being ideally as high as it can be without the material rupturing or being prone to rupture during handling of the wrapped bale.

A net wrap material active roll 112 is supported temporarily by a pair of downwardly and forwardly inclined, planar, roll end supports 114 respectively extending transversely from the support walls 84 at locations which place the supports in a plane that extends slightly above the axis of rotation of the upper feed roll 86, the feed roll 86 serving as the primary or sole support for the material roll 112. Provided for biasing the active wrap material roll 112 into engagement with the feed roll 86 is a biasing assembly 116 comprising a pair of transversely spaced arms 118 having their forward ends pivotally attached, as by a pair of pins 120, to the pair of brackets 80. A roller 122 is rotatably mounted in the rear ends of the arms 118 and is located so as to maintain engagement with an upper rear quadrant of the wrap material active roll 112 as the roll becomes smaller as material is used in wrapping bales. The biasing assembly 116 further includes a pair of links 124 having lower ends respectively pivotally received on a pair of pins 126 welded to the arms 118, and having upper ends respectively pivotally coupled, as by a pair of pins 128, to rearward legs of a pair of crank arms 130 that are, in turn, respectively pivotally connected, as by pins 132, to the pair of crankarm support brackets 76. A yieldable force for biasing the roller 122 against the active wrap material roll 112 is provided by a pair of gas or air cylinders 134 having their rod ends respectively pivotally connected, as by a pair of pins 136, to forward legs of the pair of crank arms 130, and having their cylinder ends respectively pivotally connected, as by a pair of pins 138, to opposite sidewalls of a cover 140. As can best be seen in FIG. 2, the cover 140 has an upper wall pivotally mounted to the panel flange 74 by a hinge structure 142 which permits the cover 140 to be swung upwardly, from its lowered closed position, shown in solid lines, wherein upright front ends of the sidewalls are in engagement with the rear of the discharge gate 20, to a raised open position angularly displaced in excess of 90° from its closed position, as shown in broken lines. In addition to biasing the roller 122 against the wrap material roll 112, the geometrical relationship between the lines of action of the cylinders 134 and the pivotal connections 132 of the crank arms 130 are such that the cylinders 134 move over center and act to yieldably retain the cover 140 in its open position. The cover 140 is releasably retained in its closed position by a centrally located latch member 144 which is received in an opening provided in a leg of an angle member 146 extending between and fixed to the support sidewalls 84. A latch handle 148 is pivotally mounted to a central location of a rear wall of the cover 140 and is operable for selectively moving the latch member 144 to and from latched engagement with the angle member 146.

Stored above and in close proximity to the wrap material active roll 112 is a wrap material spare roll 150. Structure for supporting the spare roll 150 includes a pair of upright legs 152 respectively including out-turned ends secured to horizontal flanges defining upper sides of the support structure sidewalls 84. The connection of each of the legs 152 to the associated sidewall 84 is yieldable and is defined by a bolt 154 projecting downwardly through respective holes in the leg end and the sidewall flange and carrying a coil compression spring 156 held in place by a nut 158 received on the lower end of the bolt 156. Extending transversely inwardly from and being fixed to each leg 152, at a location spaced downwardly from the top of the leg, is a sheet metal plate 160 that is arcuately curved so as to define a concave upper support surface on which rests the lower rear quadrant of a respective end of the spare roll 150.

It is here noted that the resilient mounting of the legs 152 permits each of them to be manually turned about the vertical axis defined by the bolt 154, as is desirable during moving of the spare roll 150 into place as the active roll once the original active roll becomes depleted. Specifically, in repositioning the spare roll 150, the cover 140 is first raised to its open position and the empty core of the active roll removed. A pair of roll loading supports 161, in the form of straps, respectively pivotally mounted to the angle member 146, at respective locations spaced to opposite sides of the latch member 144 at approximately at the height of the roll end supports 114, for being swung about respective upright axes, are then pivoted from laterally extending stored positions, as shown in solid lines, to rearwardly extending support positions. A length of net material 162 is then pulled off the front of the spare roll 150 and fed downwardly in front of the guide roll 106 and then rearwardly over the upper feed roll 86 and then through the nip between the feed rolls 86 and 88. The spare roll 150 is then lowered onto the supports 161. The legs 152 of the roll end supports are then rotated 180° so that the roll end support plates 160 project outwardly. With the plates 160 out of the way, the biasing assembly arms 118, together with the pressure applying roller 122, are manually raised to a substantially vertical position where they are over center and remain raised. With the roller 122 out of the way, the spare roll 150 may be rolled into place over the planar roll end supports 114 and onto the feed roll 86. The arms 118 are then lowered so that the roller 122 engages the new active roll of wrap material. The loading supports 161 are then returned to their stored positions, the roll end support legs 152 returned to their operative positions, and the cover 140 closed. When convenient, the removed spare roll is replaced by a new spare roll by once again opening the cover 140, pivoting the loading supports 161 to their load position, rolling a new spare roll onto the supports 116 and then lifting the roll from there, one end at a time if desired, onto the support plates 160. The cover 140 is then lowered to its closed position.

As can best be seen in FIG. 2, the net material guide assembly 93 includes a support frame comprising a pair of frame members 168 converging rearwardly from a front pair of support brackets 170 to a pair of rear support brackets 172. The front pair of support brackets 170 are respectively fixed to lower front locations of the pair of discharge gate sidewalls 22 and also serve to carry bearing supports for bearings located on opposite ends of the belt support roll 40. The rear pair of support brackets 172 are adjustably mounted, in a conventional manner not shown, to the wrapping assembly side walls 84 by straps extending downwardly through slots in the cover 140 provided at respective locations below opposite ends of the lower wrap material feed roll 88. Located underneath each of a plurality of belt runs 164, extending fore-and-aft between the support rolls 38 and 40, is an inverted channel member 174. The rear end of each channel member 174 abuts and is welded to a transversely extending, inverted u-shaped channel member 176, located directly below the rear belt support roller 38. The forward end of each channel member 176 terminates directly below the front belt support roller 40, and, at a location spaced rearwardly of the roller 40, its flanges are arcuately notched to fit, and are welded to, the top of a cylindrical cross member 178. The cross member 178 has its opposite ends respectively secured to the pair of front brackets 170. The guide pan 92 overlies and is fixed to upper surfaces of each of the channel members 174 and of the channel member 176 and extends rearwardly from the channel member 176 to a location adjacent the rear of the discharge gate 20. The length of wrap material 162 extends beneath the roll 38 and through the nip 90 defined between the belts 42 and the guide pan 92. The top surfaces of the webs of the inverted channel members 174 collectively form a guide surface which supports the length of wrap material 162 in an area extending between the lower rear and lower front belt support rolls 38 and 40, the belt runs 164 acting to carry the wrap material into the baling chamber 56 via the inlet 60 where it is engaged by and wrapped upon the periphery of the rolling bale 58, which acts together with the belts 42 to pull wrap material from the active material roll 112. A downwardly bowed transversely extending leaf spring 180 has its opposite ends located within and pivotally secured to the inverted channel member 176 with the central portion of the spring 180 engaging the guide member frame members 168. The spring 180 acts to keep the guide pan 92 and channel members 174 in contact with the belt runs 164 so that the length of net material 162 is positively engaged with and carried to the baling chamber 56 by the runs 164.

It is necessary that the length of net wrap material 162 be substantially at its full width when it passes around the lower front roll 40 in order for the material to extend over the ends of the bale 58, as shown at 181 in FIG. 1. Although some bales have been successfully wrapped without doing any more than using conventional, but longer, belt support rolls in the respective locations of the lower rear and lower front rolls 38 and 40, it is preferable that the opposite ends of these rolls include devices for positively acting on the length of wrap material 162 to ensure that it is at its full width at the time it enters the baling chamber 56. Specifically, the central portion of the lower rear roll 38, i.e., that portion which extends between the gate sidewalls 22 and supports the belts 42, is of conventional construction while the opposite ends of the roll 38 are defined by extensions in the form of a rear pair of right- and left-hand spreader rolls, with only the right-hand spreader roll 182 being shown. Similarly, opposite ends of the lower front belt support roll 40 are respectively defined by extensions in the form of a front pair of right- and left-hand spreader rolls 186 and 188. It is here noted that the left rear spreader roll is substantially identical to the spreader roll 182, and that the spreader roll 186 is substantially identical to the spreader roll 188, the spreader rolls at one side of the baler 10 merely having spirals, described below, which are of a different hand than those at the other side of the baler.

Referring now to FIG. 5, the rear right-hand spreader roll 182 is shown as being in the form of a cylindrical tube or sleeve provided with a pair of spiral grooves 190 that begin at diametrically opposite locations at the inner end of the roll and terminate 180° from their starting point. A flat, uninterrupted zone 192 extends axially outwardly from the grooves 190 and is followed by a pair of separate spiral ribs 194, that are basically located on diametrically opposite portions of the roll, but with each rib 194 including opposite end portions that overlap and parallel the central portion of the other rib. The pitch of the spiral grooves 190 and spiral ribs 194 is such as to tend to move the opposite sides of the length of net material 162 outwardly against any tendency for the material to narrow due to the tension exerted thereon during wrapping a bale.

The front right-hand spreader roll 186 is shown in FIG. 6 and is provided with a pair of spiral grooves 196, a flat zone 198 and a pair of spiral ribs 200 that are respectively similar to the grooves, flat zone and ribs of the rear right-hand spreader roll 182.

Respectively acting in conjunction with the front, right- and left-hand net spreader rolls 186 and 188 to ensure that the length of net material 162 is placed over the corner of the bale 58 are right- and left-hand guide plates 202 and 204 that are respectively secured to the discharge gate sidewalls 22 in the vicinity of the net spreader rolls 186 and 188 where the length of net material 162 enters the inlet 60 to the baling chamber 56. The purpose of the plates 202 and 204 is four-fold. The first is to create a space at the edge of the bale for the introduction of the net, the second is to provide a channel through which the net material can travel so as to reach the space created at the edge of the bale, the third is to round the corners of the ends of the bale being wrapped so that the net more easily folds over it and the fourth is to deflect crop away from the spiral of the spreader rolls 186 and 188 so that the crop does not interfere with the feeding of the net.

The plates 202 and 204 each include predominately planar outer surfaces 206 (FIGS. 2 and 3) that are respectively secured flat against inner surface locations of the sidewalls 22 by appropriate fasteners (not shown) extending through a pair of mounting holes 208 provided in central locations of the plates, and matched with respective holes provided one each in the sidewalls 22 and in the mounting brackets 170. The shape of an inwardly facing surface of each of the plates 202 and 204 is what achieves the first purpose of providing space for the net material. Specifically, as considered when mounted to the sidewalls 22 and with reference to clockwise rotation of the bale 58 in the baling chamber 56, each of the plates 202 and 204 includes a relatively thin, upper horizontal edge 210 and a front vertical edge 212. Each of the plates 202 and 204 further includes an inner surface defined by a central, innermost portion 214 spaced inwardly from and disposed parallel to the associated gate sidewall 22. The surface portion 214 is joined to the upper edge 210 of each plate by an inwardly and downwardly inclined surface portion 216, and is joined to the forward edge 212 by a rearwardly and inwardly inclined surface portion 218. The inner surface portion 214 and the inclined surface portions 216 and 218 of each plate are located within the baling chamber 56 so as to contact a radially outer section of the end of the bale 58 as this bale section rotates past the plates. This results in the edge section at the opposite ends of the bale 58 being wedged away from the sidewalls 22 to create a small space or void which remains at least for a small distance rearwardly beyond the plates 202 and 204.

The plates 202 and 204, have respective lower edges 220 including forward portions which respectively extend arcuately about the net spreader rolls 186 and 188 in close but spaced relationship to the flat uninterrupted zones 198 of the net spreader rolls. As viewed in FIGS. 1–4, the lower edge 220 extends between a rear location at approximately ten o'clock and a forward location chosen to deflect crop being delivered by the pickup 62 and here shown as being at about three o'clock, which is practically the minimum distance the edge should extend. Provided for guiding the length of net material to the space or void created by the shape of the inner side of each of the plates 202 and 204 is a channel or passage created between the associated sidewall 22 and the outer surface 206 at a recess 222 inclined upwardly and rearwardly in the outer surface 206 of each of the plates from the lower edge 220, from a location adjacent the ten o'clock position of the associated spreader roll 186 and 188, to a rear edge 224 (FIG. 4) of the plate. The height of each recess 222 increases from front to rear.

For performing the above-stated third purpose of the plates 202 and 204, their respective lower edges 220 are thickened in their respective portions extending about the spreader rolls 186 and 188 and have inner radiused corner sections 226 which extend arcuately about the associated spreader roll 186 or 188. Thus, as the bale 58 rotates across the radiused corner sections 226 at the opposite ends of the bale, the outer corners of the bale are rounded.

The above-stated fourth purpose of the plates 202 and 204 is achieved by a crop deflector or stripper 228 that extends transversely outwardly from the forward vertical edge 212 (FIG. 4) of each plate so as to be positioned in front of the associated spreader roll 186 or 188, to prevent, or at least lessen the likelihood that crop material being delivered to the baling chamber inlet 60 by the pickup 62 will wrap around the rolls 186 and 188, where it could interfere with the feeding of the length of wrap material 162. The deflectors 228 are here shown as being substantially triangular in front view but could be any other shape which is effective to perform the desired function.

It is here noted that in addition to the spreader roll grooves 196 and the deflectors 228 acting to keep crop materials from interfering with the net as it passes about the roll 40, and especially about that part of the roll including the net spreading rolls 186 and 188, that all roll support structure and belt guide surfaces that are in close proximity to the bottom of the roll are eliminated so as to eliminate any possible collection point for crop material beneath the roll 40, with any such supports or guides being spaced from the roll 40, especially its spreading rolls 186 and 188, to form a gap at least equal to the spacing of the lower guide plate edges 220 from the roll, so that any crop which does pass between the guide plate edges and the roll will merely fall through this gap to the ground.

Thus, it will be appreciated that the length of net wrap material 162 arrives at the plates 202 and 204 in a completely spread condition where it is wider than the distance between the baler discharge gate sidewalls 22, and hence, wider than the distance between the plates 202 and 204. The net material 162 will be in a tensioned state with the central portion of the material being engaged with the bale 58. The rotation of the bale 68 together with the moving bale-forming belts 42 will act to draw the outer marginal portions 181 of the net 162 into the bale chamber. These marginal portions 181 will travel through the channels defined by the guide plate recesses 222 and the sidewalls 22. While these marginal portions 181 will not be tensioned as much as the remainder of the net material, some tensioning will occur at the marginal portions and the elasticity of these marginal portions will result in the marginal portions 181 being drawn tight over the edges of the bale 58, as shown in FIG. 1.

Referring now to FIG. 7, there is shown a first alternate embodiment wherein the recess 222 is removed from the guide plate 204 and formed as recess 222' that is located in the sidewall 22'. In this structure a guide plate 204', which is like the plate 204, but without the recess, cooperates with the sidewall recess 222' to form a channel or passage through which the marginal portions 181 of the net will pass during wrapping of the bale 58.

Referring now to FIG. 8, there is shown a further alternate embodiment wherein a sidewall 22" having a lower front area 204" formed to define inner surface portions which are like those of plate 204, shown in FIG. 4, and given the same reference numerals. The area 204" serves to create a void between the outer peripheral portion of the bale 58 and the sidewall 22" at least at the zone immediately following a trailing edge of the formed area 204". An opening 223 is provided in the sidewall 22" to provide access to this zone for the outer marginal portions 181 of the net material. Thus the need for separate plates and the hardware for attaching them is avoided.

Once approximately one and one-half to two wraps of the length of wrap material 162 has been wrapped on the bale 58, a net severing device 232 is actuated to sever the tensioned net at a location between the net feed rolls 86 and 88, and the nip 90 formed between the belts 42 and the net guide pan 92. Specifically, as can best be seen in FIG. 2, the net severing device 232 comprises a stationary knife 234 extending transversely between the vertical support walls 84 and defining an upwardly extending cutting edge 236 which is located just below the path taken by the length of net wrap material 162. Pivotally mounted to the rear edge of and extending across the support walls 84 is a crank shaft 238 having a pair generally L-shaped anvil support arms 239 fixed thereto at respective locations adjacent opposite sides of the support walls 84, the arms extending forwardly alongside the support walls and terminating at locations adjacent the belts 42 and above the plane which is tangent to each of the feed rolls 86 and 88. An angular anvil 240 extends between and is fixed to forward ends of the support arms 239. Fixed to the crank shaft 238 at a location outwardly of the right-hand arm 239 is an upwardly extending crank arm 242 to which is attached an output end of a linear actuator 244 having a pivotal attachment 246 with a stiffener member located on the exterior of the discharge gate sidewall. When the bale 58 becomes wrapped with the desired amount of net wrapping material, the actuator 244 is caused to retract so as to swing the anvil 240 downwardly so that it engages the length of net material 162 and forces it into contact with the cutting edge 236 of the knife 234. The bale 58 is still rotating at this time while the drive to the feed rolls 86 and 88 is discontinued. The tension of the length of wrap material 162 thus increases so as to aid in the severing of wrap material.

The operation of the net wrapping mechanism 70 is thought to be clear from the foregoing description and for the sake of brevity is not repeated here. Suffice it to say that, while the mechanism 70 is operable to deliver wrapping material of differing constructions, the usage of a net material constructed like that disclosed in the aforementioned U.S. Pat. No. 5,104,714 results in a bale which is tightly wrapped about its circumference and ends so as to have very good water shedding characteristics if the net is stretched about 15% when wrapped on the bale. Further, while the net guide plates 202 and 204 are here shown applied to an expansible baling chamber formed from belts, they would also have utility in fixed chamber balers where they would be mounted adjacent rotatable bale-forming members in the vicinity of the inlet through which the wrapping material is fed, not necessarily the crop inlet. Also, it is to be noted that the functions of the guide plates 202 and 204 could be achieved by using guide plates constructed like the plate 204' together with a modified sidewall 22' where the wall is formed with a recess instead of the plate for the purpose of permitting the outer edge portions 181 of the length of wrap material 162 to pass into the baling chamber 56 for wrapping over the ends of the bale 58. The same is true of the embodiment shown in FIG. 8 where the inner shape of the plate 204 is replicated at 204" in the wall 22" with an opening 223 being formed in the wall 22" to permit passage of the outer edge portions 181 of the length of wrap material 162.

Further, it is to be noted that while the invention is here described in conjunction with an expansible chamber baler, it is to be understood that the guide plates 202 and 204 and the first and second alternate embodiments, shown in FIGS. 7 and 8, could be applied to fixed chamber balers, i.e., balers having their chambers defined by fixed rolls or by fixed belt conveyor segments, with the plates 202 and 204 or their alternates being located adjacent any opening to the bale chamber defined by the elements forming the baling chamber and into which it is desired to direct the net wrapping material.

We claim:

1. In a large round baler including a bale-forming chamber defined in part by a bale discharge gate having opposite sidewalls spaced apart by a predetermined distance for forming bales in said chamber, lower rear and lower front bale-forming belt support rolls extending between and being rotatably supported by said opposite sidewalls of said discharge gate with said lower front roll defining a rear side of a crop inlet leading to said chamber, a plurality of side-by-side disposed bale-forming belts having respective fore-and-aft runs extending between and engaging said lower rear and lower front support rolls, said baler being equipped with a net wrapping mechanism including a wrap material guide surface underlying said fore-and-aft runs, the wrapping mechanism being operable for introducing a length of net wrap material into said crop inlet along a path defined between said wrap material guide surface and said fore-and-aft runs of said belts and in contact with said fore-and-aft extending runs of said belts whereby the net material is captured between the bale and the bale-forming belts, the improvement comprising: said lower front roll having opposite end portions respectively extending outwardly beyond said sidewalls of said chamber; and said net wrapping mechanism being dimensioned for introducing the length of wrap material over the full width of said lower front roll so as to be at a width greater than said predetermined dimension with outer marginal portions of said wrap material being respectively in engagement with said opposite end portions of said lower front roll; and said sidewalls of said gate having lower edges located above a plane extending tangentially to each of said lower rear and lower front support rolls so that said opposite marginal portions of said length of net wrap material may extend through respective gaps defined between said lower edges of said sidewalls of said gate and said wrap material guide surface.

2. The large round baler defined in claim 1 wherein said lower front roll includes right- and left-hand net spreader rolls at its opposite ends which extend outwardly beyond said opposite sidewalls at respective locations for engaging said length of wrap material; and said right- and left-hand spreader rolls respectively having spiral surfaces shaped for causing the length of wrap material to be spread to its full width so that opposite marginal portions thereof are respectively outboard of said chambers sidewalls.

3. The large round baler defined in claim 2 and further including right- and left-hand guide plates respectively fixed to inside locations of said sidewalls of said discharge gate respectively adjacent said right- and left-hand spreader rolls; said guide plates having surfaces which are inclined outwardly and located to engage outer end portions of a bale being formed such that as the outer end portions of the bale move past the plates a void is produced between the adjacent sidewall and an adjacent outer end portion of the bale at least immediately behind the plates; and each plate having a recessed outer surface portion leading from the adjacent spreader roll to a rear end of said plate and cooperating with the adjacent sidewall to form a channel for guiding the marginal portions of the length of net material to said void to thereby place said marginal portions over edges at the outer end portions of the bale.

4. The large round baler defined in claim 3 wherein each of said guide plates includes an inwardly facing radiused surface which extends about upper portion of an adjacent outer end portion of said front roll in a position so as to be engaged by said outer end portions of the bale at said end edges thereof so that these edges are rounded for presenting a more suitable surface for receiving said marginal portions of the length of net material.

5. The large round baler defined in claim 1 and further including right- and left-hand net guide plates respectively fixed to inside locations of the sidewalls of said discharge gate respectively adjacent opposite end portions of said lower front belt support roll which are outboard of said opposite sidewalls of said discharge gate; said guide plates having surfaces which are inclined outwardly and located to engage outer end portions of a bale being formed such that as the outer end portions of the bale move past the plates a void is produced between the adjacent sidewall and an adjacent outer end portion of the bale at least immediately behind the plates; and each plate having a recessed outer surface portion leading from the said lower front roll to a rear end of said plate and cooperating with the adjacent sidewall to form a channel for guiding the marginal portions of the length of net material to said void to thereby place said marginal portions over edges at the outer end portions of the bale.

6. The large round baler defined in claim 4 wherein each of said spreader rolls includes a smooth circumferential zone located between portions of said spirals extending about the roll; and each of said plates having a lower edge including a forward portion extending arcuately about an adjacent spreader roll in spaced but close relationship to a length of said smooth circumferential zone extending, as viewed from a right side of the baler, from about a ten o'clock position to a forward position sufficiently far so as to intercept crop delivered to the chamber inlet.

7. The large round baler defined in claim 6 wherein no structure exists immediately below said spreader rolls which would allow crop material to accumulate and interfere with the feeding of net material to the bale-forming chamber.

8. The large round baler defined in claim 5 wherein each of said plates includes a lower forward portion defining a crop deflector that extends transversely in front of the adjacent spreader roll so as to keep crop from wrapping on said spreader roll and interfering with the feeding of said marginal portions of said length of net material into said chamber.

9. The large round baler defined in claim 5 wherein said spirals of each of said spreader rolls include raised ribs located outwardly of said smooth circumferential zone and grooves located inwardly of said smooth circumferential zone, the grooves serving to aid in spreading the length of wrap material to its full width while not having a tendency to grab crop and convey it outwardly along the spreader rolls so as to interfere with the feeding of said marginal portions of said length of net material into said chamber.

10. The large round baler defined in claim 1 wherein said lower rear and lower front rolls each have opposite end portions defined by right- and left-hand net material spreader rolls which operate to maintain said length of net wrap material at its full width for introduction into said baling chamber.

11. An improved net wrapping mechanism for a large round baler, comprising: a bale-forming chamber having opposite sidewalls and a transverse opening extending the full width of said chamber between said sidewalls; said bale-forming chamber including a rotating element having an arcuate surface defining one side of said transverse opening and including a rotatable roll having opposite end portions respectively projecting outwardly beyond said opposite sidewalls; a net handling assembly adapted for introducing net material, having a width approximately equal to the distance between extreme outer ends of said rotatable roll, over the length of said rotatable roll and through said opening for introduction into a nip defined between a rotating bale just formed in the chamber and said arcuate surface, whereby the net material will be carried into the baling chamber; a pair of bale end engaging structures respectively extending inwardly from vertical, planar inner surface portions of said opposite sidewalls in the vicinity of opposite ends of said roll; each bale end engaging structure having a leading and a trailing edge relative to a direction of rotation of the bale; and a passage leading from a location outwardly of each sidewall adjacent a respective end portion of said rotatable roll to a location immediately adjacent said trailing edge of a respective one of said bale end engaging structures whereby outer marginal portions of said net can pass from said opposite end portions of said roll into said bale chamber so as to be wrapped over opposite ends of said bale.

12. The improved net wrapping mechanism defined in claim 11 wherein said bale end engaging structures are defined by a pair of plates respectively mounted adjacent said opposite end portions of said rotatable roll to inner surface locations of said opposite sidewalls; said plates each having an outer surface engaging an adjacent one of the sidewalls, having an inner surface forming a respective bale end engaging surface and a respective one of said trailing edges; and each passage being defined by and extending between a respective one of the inner surfaces of said plates and the adjacent sidewall and extending to the trailing edge of the adjacent plate.

13. The improved net wrapping mechanism defined in claim 12 wherein said sidewalls each include a planar area covered by an associated one of said pair of plates; and each plate having an outer surface provided with a recess which cooperates with said associated sidewall to define said passage.

14. The improved net wrapping mechanism defined in claim 12 wherein each of said plates includes a widened lower edge portion extending arcuately about an adjacent one of said roll end portions and forming a radiused, inwardly facing surface located to engage and round the adjacent edge at one end of the bale.

15. The improved net wrapping mechanism defined in claim 12 wherein each of said sidewalls includes a recess cooperating with an outer surface portion of the associated plate to define said passage extending to the trailing edge of the plate.

16. The improved net wrapping mechanism defined in claim 11 wherein said bale end engaging structures are respectively formed as an integral parts of said opposite side walls; and said passage being an opening through each sidewall adjacent the trailing edge of the adjacent bale end engaging structure.

17. The improved net wrapping mechanism defined in claim 11 wherein each of said opposite end portions of said roll are defined by wrap material spreader rolls.

18. The improved net wrapping mechanism defined in claim 17 wherein each of said wrap material spreader rolls includes a combination of spiral grooves and spiral ribs with the spiral grooves being at the inner end of each of the spreader rolls and the spiral ribs being at the outer end portion of each of the spreader rolls.

19. The improved net wrapping mechanism defined in claim 18 wherein each spreader roll includes a smooth surface portion located between the spiral grooves and the spiral ribs; and each plate including a lower edge portion extending about the adjacent spreader roll at said smooth surface portion, whereby said spiral grooves act together with said spiral ribs to maintain the net material at its full width across the roll without acting to carry crop material outwardly from the baling chamber.

* * * * *